United States Patent [19]

Poulos

[11] 3,718,980

[45] March 6, 1973

[54] MEASURING CONSTRUCTION

[76] Inventor: George Poulos, 3020 Pearl St., Franklin Park, Ill. 60131

[22] Filed: May 20, 1970

[21] Appl. No.: 39,105

[52] U.S. Cl............33/174 G, 33/DIG. 20, 33/174 G
[51] Int. Cl..........................B43l 7/06, B43l 13/00
[58] Field of Search...........33/174 R, 174 G, 103, 94

[56] References Cited

UNITED STATES PATENTS

| | | | |
|---|---|---|---|
| 2,770,043 | 11/1956 | Kwiecinski | 33/103 |
| 888,070 | 5/1908 | Dissell | 33/103 |
| 1,886,300 | 11/1932 | Oslund | 33/174 G |
| 1,619,091 | 3/1927 | Rieser | 33/75 R |

Primary Examiner—Leonard Forman
Assistant Examiner—Paul G. Foldes
Attorney—McDougall, Hersh & Scott

[57] ABSTRACT

A measuring device for use in determining the span between two objects and for use in marking a piece of material whereby the material can be cut to a desired size for filling the span. Said device comprising a longitudinally extending main body portion having a transversely extending edge member located at one end of the body portion. A slot extends longitudinally of the body portion, and a guide member is attached to the body portion and is movable along said slot. The guide member defines a first surface for engaging the edge of an object, and the body portion can then be moved relative to the guide member for engagement of its transverse edge with the object on the opposite side of the span. Subsequent to this, the guide member can be placed in engagement with a piece of material which is to be employed for filling the span. The transverse edge then serves as a means for locating a mark or scoreline to achieve accurate severing of the piece of material.

4 Claims, 13 Drawing Figures

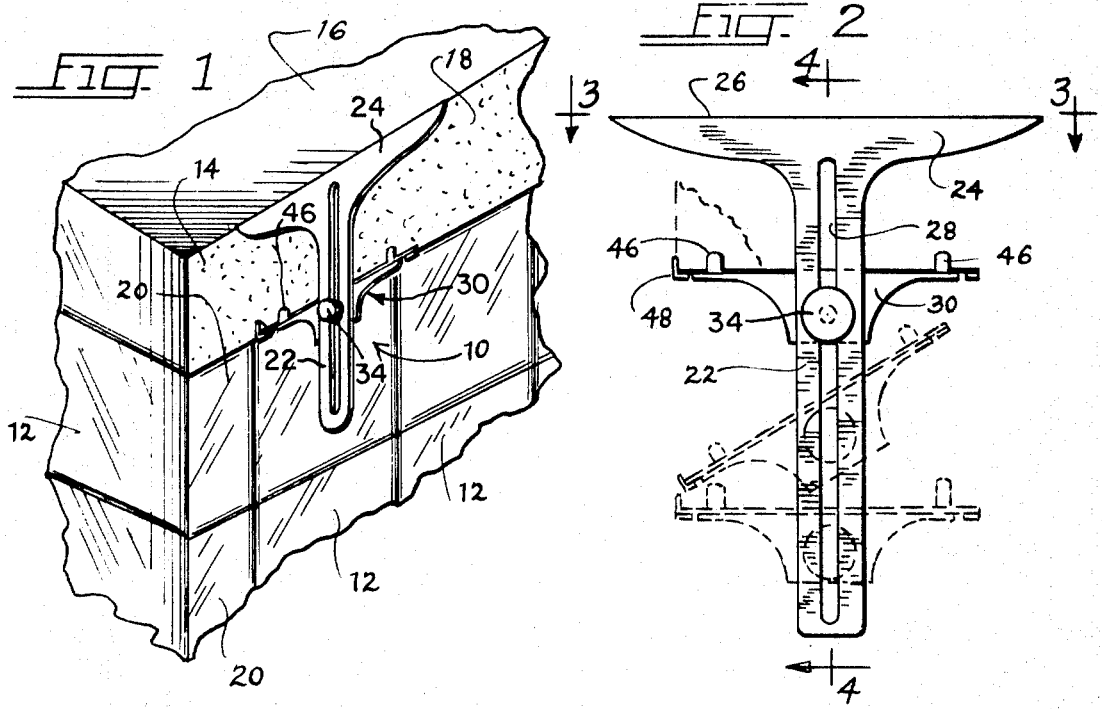
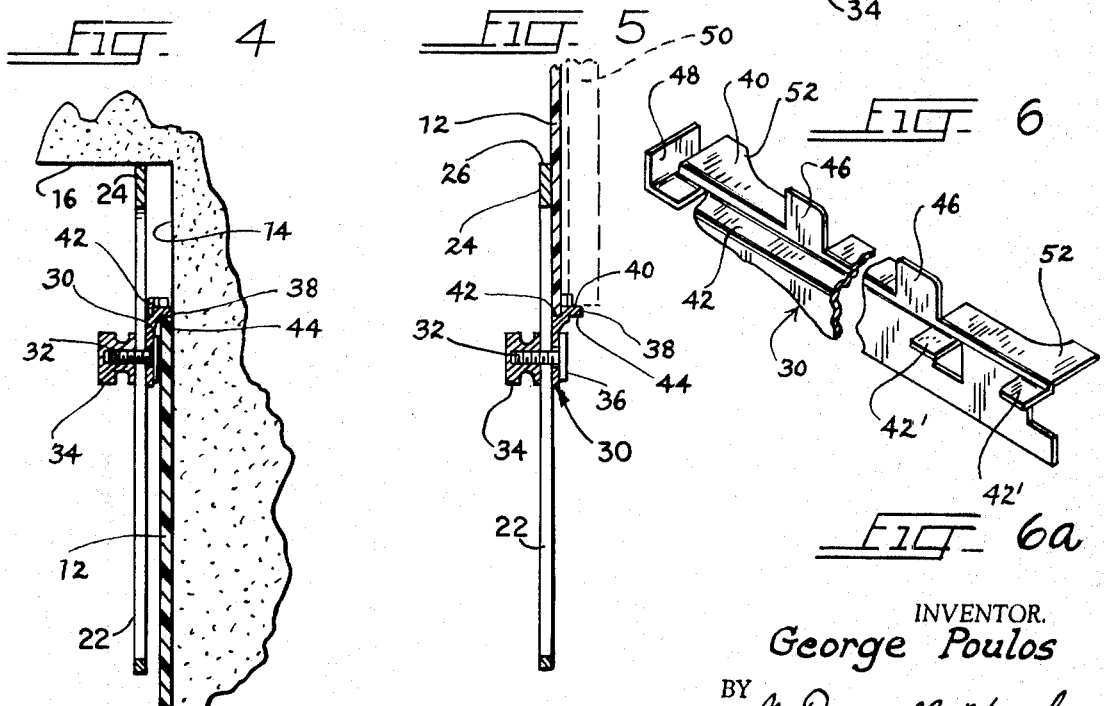

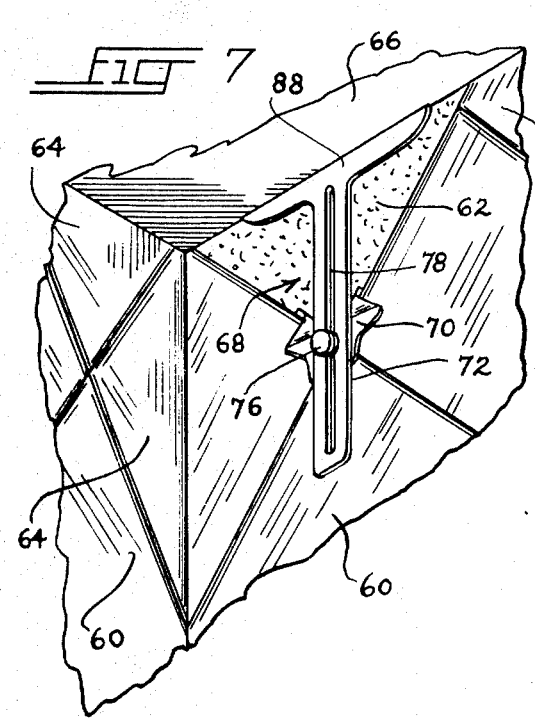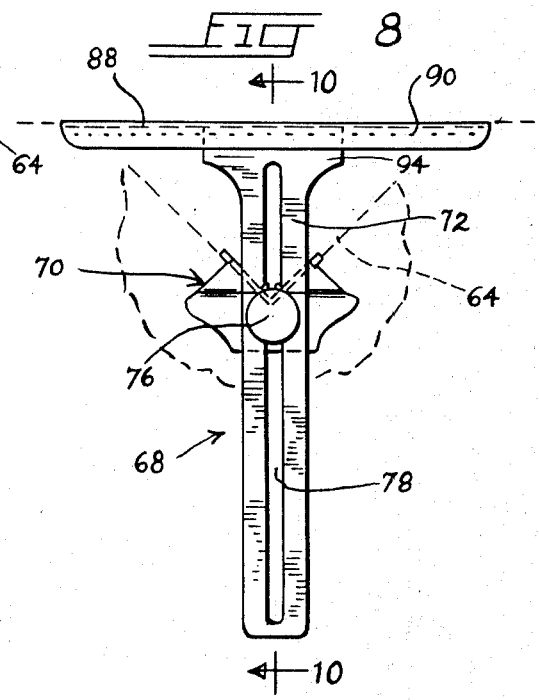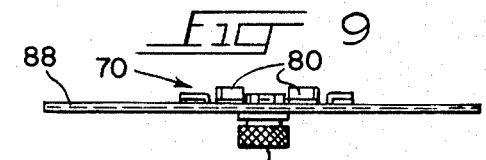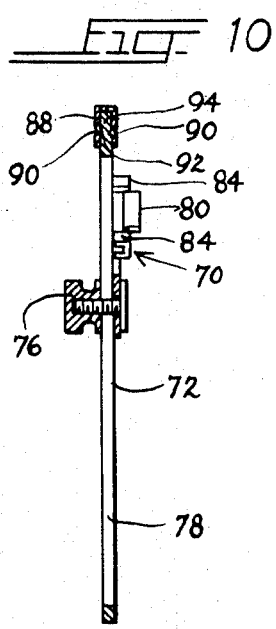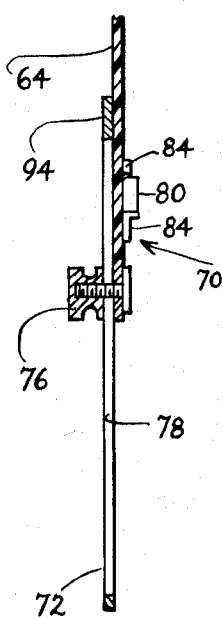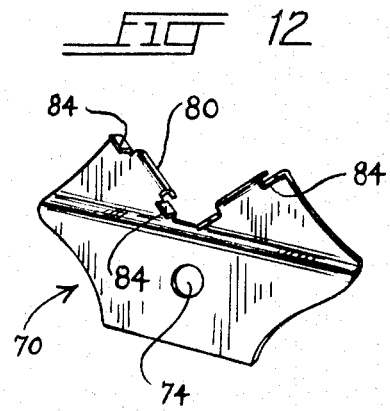

3,718,980

MEASURING CONSTRUCTION

This invention relates to an improved construction for measuring the distance of a span between two objects and for then marking a piece of material so that the material can be cut to the size necessary for filling the span. The invention finds particular utility in operations involving the installation of floor, wall and ceiling tile, wall paneling, and similar materials.

In the course of installing tile or paneling, it is almost invariably necessary to cut some pieces to a size smaller than the standard size. For example, floor tiles must usually be cut into smaller pieces to fill the gap between the last row of full tiles and an adjacent wall.

The measuring involved in determining the size of tile necessary for a particular area is somewhat difficult, especially where the edge of the last full row of tiles or panels is not exactly parallel with an adjacent wall. This often leads to a waste of material or to an unsightly job. The problems of making accurate measurements are magnified where relatively inexperienced individuals are involved in installation. Since a substantial proportion of tiling and paneling is done on a "do it yourself basis", there is a definite need for a measuring means which will eliminate problems previously encountered.

It is a general object of this invention to provide an improved measuring device which is particularly suitable for use during installation of tile and paneling.

It is a more specific object of this invention to provide an improved measuring construction which serves as an accurate means for determining the size of a span which is to be occupied by a piece of tile or paneling.

It is a further object of this invention to provide a device of the foregoing type which also serves as a highly convenient means for marking or scoring a piece of tile or paneling whereby the material can be easily cut to the desired size.

These and other objects of this invention will appear hereinafter, and for purposes of illustration, but not of limitation, specific embodiments of the invention are shown in the accompanying drawings in which:

FIG. 1 is a perspective view of a measuring device incorporating the features of this invention and illustrated in position for achieving a measuring function;

FIG. 2 is a plan view of the device shown in FIG. 1;

FIG. 3 is an end elevational view of the device taken about the line 3—3 of FIG. 2;

FIG. 4 is a vertical, sectional view of the device taken about the line 4—4 of FIG. 2 and illustrating the device in position for measuring;

FIG. 5 is a cross-sectional view of the device in position for marking or scoring purposes;

FIG. 6 is a perspective fragmentary view of a design for the guide member of the device;

FIG. 6a is a perspective fragmentary view of an alternative design for the guide member of the device;

FIG. 7 is a perspective view illustrating a modified form of the invention wherein a corner guide member is associated with the device;

FIG. 8 is a plan view of a further alternative form of the invention which includes a movable transversely extending edge member;

FIG. 9 is an end elevational view of the construction shown in FIG. 8;

FIG. 10 is a vertical sectional view taken about the line 10—10 of FIG. 8;

FIG. 11 is a vertical sectional view showing use of the construction in marking or scoring position; and, FIG. 12 is a perspective view illustrating the corner guide member.

This invention generally comprises a measuring device which is particularly useful for determining the span between two stationary objects. The device also serves as a means for locating a mark or scoreline on a piece of material so that the piece can be cut to the desired size for filling the span between the objects. The invention finds its greatest utility in tile setting of paneling operations.

The structure of the invention comprises a main body portion which extends longitudinally and which has a transversely extending edge portion at one end. A guide member is movably mounted on the body portion, and this guide member is moved during use of the construction with the extent of movement depending upon the size of the span to be filled.

The guide member defines a flange whereby the edge of an object such as a tile can be engaged for purposes of holding the guide member in position relative to the tile. The body portion is then moved relative to the guide member until the transversely extending edge of the body portion engages a wall or other object on the other side of the span. Once the body portion has been moved to the measuring position, the construction of the invention is used for marking a piece of tile which will then be cut to fill the particular span. This marking operation can be accurately accomplished by engaging a surface of the guide member with the tile to be cut while the transverse edge extends outwardly over the surface of the tile. By marking the tile along the line traversed by the transverse edge, an accurate basis is provided for cutting of the tile.

One specific form of the invention is shown in FIGS. 1 through 5. For purposes of illustration, the instrument 10 is shown in FIG. 1 in association with tiles 12 located on the wall 14 adjacent the juncture of the wall with ceiling 16. A bend is defined in the wall 14, and this configuration requires tiles of smaller size for filling the span 18 between the uppermost row of full tiles and the ceiling. Smaller pieces of tile 20 are also required between the vertically extending row of full tiles and the wall corner.

The device 10 consists of a longitudinally extending main body portion 22 and a transversely extending end portion 24. A straight edge 26 is defined by the end portion while a slot 28 is formed in the main body portion. In order to accommodate various measuring operations which might be encountered, the straight edge 26 should be at least as long as the longest side of a tile being handled, and is preferably at least as long as the diagonal line between corners of the tile. The main body portion should be at least as long as the straight edge portion.

A guide member 30 is attached to the body portion 22. As best shown in FIGS. 4 and 5, the guide member 30 is secured to the body portion 22 by means of a threaded bolt 32 and nut 34. The guide member 30 also defines a stepped flange 38 having a front face portion 40 and an inwardly recessed front face portion 42. The rear face of the flange defines a face portion 44.

FIG. 1 illustrates the manner in which the construction is used when preparing the last row of tiles for location of the tiles immediately adjacent the ceiling 16. As best shown in FIG. 4, the rear face 44 of the flange 38 on the the guide member is brought into engagement with the edge of full tile 12. When the guide member is held in this position, the body portion 22 is moved relative to the guide member until the transverse edge 26 engages the ceiling 16. It will be noted that the main body portion and associated edge portion can be pivoted relative to the guide member. Accordingly, if the upper edge of the top row of tiles is not exactly parallel with the ceiling 16, then the edge 26 will be positioned at a corresponding angle.

The nut 34 is preferably tightened once the edge 26 is in place against the ceiling 16. This will lock the guide member and straight edge in the proper relative position including whatever angle might be assumed by the straight edge.

A piece of tile 12 can then be cut to form a piece 18 of smaller size by first locating the guide member in engagement with a piece of tile in the manner shown in FIG. 5. Specifically, the surface portion 42 of the guide member is engaged by the tile. Since the surface portion 42 is recessed a distance equal to the thickness, this thickness is taken into consideration to avoid an error in measurement.

Once the transverse edge 26 is in place as shown in FIG. 5, then a pencil mark or scoreline can be made in the tile with a cutting or severing operation following. It will be appreciated that where reference is made in the claims to marking, scoring and cutting, various conventional operations for reducing the size of a piece of tile or paneling are included within the scope of these terms.

A pair of longitudinally extending tabs 46 are formed in the guide member. These tabs serve as means for holding the edge of the tile 12 in position relative to the surface 42 until the marking or other operation is accomplished. A stop means 48 is defined at one end of the guide member for engagement with the corner of a tile. The combination of the tabs 46 and corner stop means provides a convenient arrangement for holding the tile firmly in place during a marking operation.

In the construction shown, the surface 42 is dimensioned for engagement with relatively thin tile, for example in the order of 1/16 inch in thickness. The construction of this invention is also designed for use with thicker materials, for example, ceramic wall tiles or wooden paneling. As best shown in FIG. 5, thicker tiles 50 are adapted to engage the surface 40 of the guide member. These tiles fit beneath the under surface of tabs 46. Since the surface 40 is not recessed, the tiles 50 will be cut to a size which differs from the span (such as span 18) by an amount equal to the thickness of the flange 38. This provides a highly useful means for leaving a gap between tiles for purposes of inserting mortar in a conventional fashion.

FIGS. 6 and 6a illustrate details of alternative configurations for a guide member. The recessed surface 42 may be formed by a stamping or other operation which leaves a step in a sheet of material. On the other hand, tabs 42' may be employed to achieve this same function. The front face 40 of the flange of the guide member preferably defines foot portions 52 at each end whereby only these foot portions will engage a wall or floor surface during a measuring operation. This will minimize the possibility of adhesive being picked up by the device during the measuring operation.

FIG. 7 illustrates an alternative form of the invention wherein the device is used to measure a span of triangular configuration. In this instance, square tiles 60 are positioned at an angle on the wall 62 and, therefore, triangular tile pieces 64 are required to fill the area adjacent the ceiling 66 and in the corner at the wall juncture. The device 68 is employed for determining the size of the tile piece which is needed to occupy the triangular area.

FIG. 12 illustrates a guide member 70 which is associated with the body portion 72 of the device 68. The guide member defines a hole 74 for attaching a nut and bolt combination 76 of the type shown in FIGS. 10 and 11. The guide member can thus be mounted for movement along the slot 78 and can be locked in place by means of the nut.

The guide member includes a downwardly extending flange 80 defining a V-shaped configuration. As shown in FIG. 7, the inside face of the flange 80 is adapted to engage the edge of one or more tile pieces 60 already in place. The straight edge defined by the transverse member 88 of the device is then placed against the ceiling 66, and the guide member is then locked in place.

Upstanding tabs 84 are defined by the guide member, and these tabs are recessed by a distance equal to the thickness of the flange 80. Accordingly, a tile can be positioned with the transverse member 88 overlying the tile surface whereby a line can be drawn across the tile for cutting purposes.

Although the design shown in FIGS. 7 and 8 is desirable where a large number of triangular or irregular shapes are involved, the construction illustrated in FIGS. 1 through 5 is also suitable for use in making measurements involving extensive cutting angles. The versatility of all of the described devices can be extended by utilizing a removable straight edge member 88 as illustrated in FIGS. 8 and 10. This straight edge comprises a strip having a plurality of indentations 90 formed along its length. These indentations 90 are received in grooves 92 defined in the opposite faces of the end 94 of the body portion 72. The combination of the indentations and grooves serves to maintain the straight edge in alignment when it is moved transversely relative to the body portion. Furthermore, the straight edge can be taken off when a smaller straight edge surface is desired for making measurements in confined areas. Thus, the end portion 94 defines a short straight edge for use in marking a tile or other piece of material.

The constructions described may be used for measuring spans between various objects, for example, between a tile already in place and a pipe extending upwardly from a floor. In this instance, the straight edge will provide a basis for making marks on a tile whereby a semi-circle can be cut in the tile to accommodate the pipe diameter.

It will be understood that various changes and modifications may be made in the above described constructions which provide the characteristics of this invention without departing from the spirit thereof particularly as defined in the following claims.

That which is claimed is:

1. A measuring device for determining the size of a tile to be used for covering the surface between two predetermined positions defined by stationary objects such as a previously positioned tile and a wall, and for use in marking the tile whereby the tile can be cut to a desired size, said device comprising a longitudinally extending main body portion, first and second ends defined by the longitudinally extending main body portion, said first end extending transversely relative to said longitudinally extending main body portion and defining a straight edge maintained perpendicular to the center line of the longitudinally extending main body portion, said straight edge comprising a removable member attached to said body portion, said member being slideable transversely relative to said body portion whereby the member can be moved to avoid obstructions, a guidemember, a slot defined by said longitudinally extending main body portion and extending between said first and second ends of the longitudinally extending main body portion, means for attaching said guide member to said longitudinally extending main body portion whereby the guide member is free to move along said slot, said guide member including a flange extending toward said surface, said flange defining a first surface facing away from said first end for engaging the edge of one of said objects, said longitudinally extending main body portion then being movable relative to said guide member whereby said straight edge defined by said first end can be moved into engagement with the other object defining the span, and including a second surface defined by said flange facing toward said first end for engaging an edge of the tile to be cut, a stop means comprising a tab extending outwardly at right angles from said second surface of said guide member toward said first end of said longitudinally extending main body portion, said tab being located at one end of said flange to thereby provide means for receiving and holding the corner of a tile, said straight edge at said first end of said longitudinally extending main body portion then extending over said tile whereby a mark or scoreline can be made on the tile for cutting purposes, and wherein said means for attaching said guide member to said longitudinally extending main body portion comprise means pivotally connecting said guide member to said longitudinally extending main body portion, and means for locking said guide member in position relative to said longitudinally extending main body portion when said first surface engages the edge of one of said objects with said straight edge engaging the other object.

2. A construction in accordance with claim 1 wherein the second surface of said flange comprises upper and lower portions, one of said portions being recessed by a distance equal to the thickness of said flange.

3. A construction in accordance with claim 2 wherein said upper and lower portions define a junction on said second surface, and including fingers extending outwardly from said junction of said upper and lower portions for supporting pieces engaging said upper portion.

4. A construction in accordance with claim 1 wherein the transversely extending straight edge defined at one end of said body portion extends for a distance at least as great as the largest dimension of pieces to be cut whereby said edge provides a straight edge for use in marking and scoring pieces of material.

* * * * *